April 29, 1930. A. G. L. G. M. MICHE DE MALLERAY 1,756,873
AUTOMATIC MACHINE FOR MILLING ORNAMENTAL
GROOVES IN BUTTONS AND THE LIKE
Filed Dec. 22, 1925 5 Sheets-Sheet 2 a. G. L. G. M. Miche de Malleray
INVENTOR

April 29, 1930. A. G. L. G. M. MICHE DE MALLERAY 1,756,873
AUTOMATIC MACHINE FOR MILLING ORNAMENTAL
GROOVES IN BUTTONS AND THE LIKE
Filed Dec. 22, 1925 5 Sheets-Sheet 5

Patented Apr. 29, 1930

1,756,873

UNITED STATES PATENT OFFICE

ALAIN GEORGES LUC GABRIEL MARIE MICHE DE MALLERAY, OF LANGEAIS, FRANCE

AUTOMATIC MACHINE FOR MILLING ORNAMENTAL GROOVES IN BUTTONS AND THE LIKE

Application filed December 22, 1925, Serial No. 77,076, and in France December 24, 1924.

My invention has for its object an automatic machine for milling a number of angularly displaced ornamental cuts in buttons and the like and relates more particularly to an improved arrangement for holding the button in front of the milling tool and adapted to give said button the successive desired angular positions with reference to the said tool. This arrangement comprises a slide which provides a retracting movement for the button between successive cuts during which movement the button holding chuck is angularly displaced by the angle required for bringing it (when brought forwards again) in the desired angular position with reference to the tool.

I have described hereinbelow by way of example with reference to the accompanying drawings a form of execution of a machine embodying my invention.

The machine shown on the drawings comprises a support 59 and a base 122. The base bears the button-holding device whilst the support bears the revolving tool-box. The base 122 is slidable with reference to the support. The movement of the base with reference to the support is provided for by a screw 126 controlled by a handwheel 127 and screwed inside the support 59. This screw is caused to move longitudinally with a projection on the base.

The support 59 bears (Fig. 2) the horizontal driving shaft 1 controlled by a pulley 2 keyed to it and bearing a loose pulley 3. A controlling belt, not shown, can be placed on either of these pulleys by means of a fork 6. The driving shaft 1 is provided with a worm 4 engaging a worm wheel 5 secured to the principal shaft 7 of the machine which is at right angles with the driving shaft 1. To this principal shaft 7 are keyed the feeding cam 8 and the slide actuating cam 9. The slide 16 is held horizontally in its bearings in a plane parallel to the vertical plane of the slide actuating cam 9 and is provided at its rear part with a roller 15 engaging an endless groove in the cam 9. By reason of the shape of this groove the slide 16 receives a to and fro motion the detail of which is given hereinbelow. The end of the slide 16 holds the button.

Figure 1:
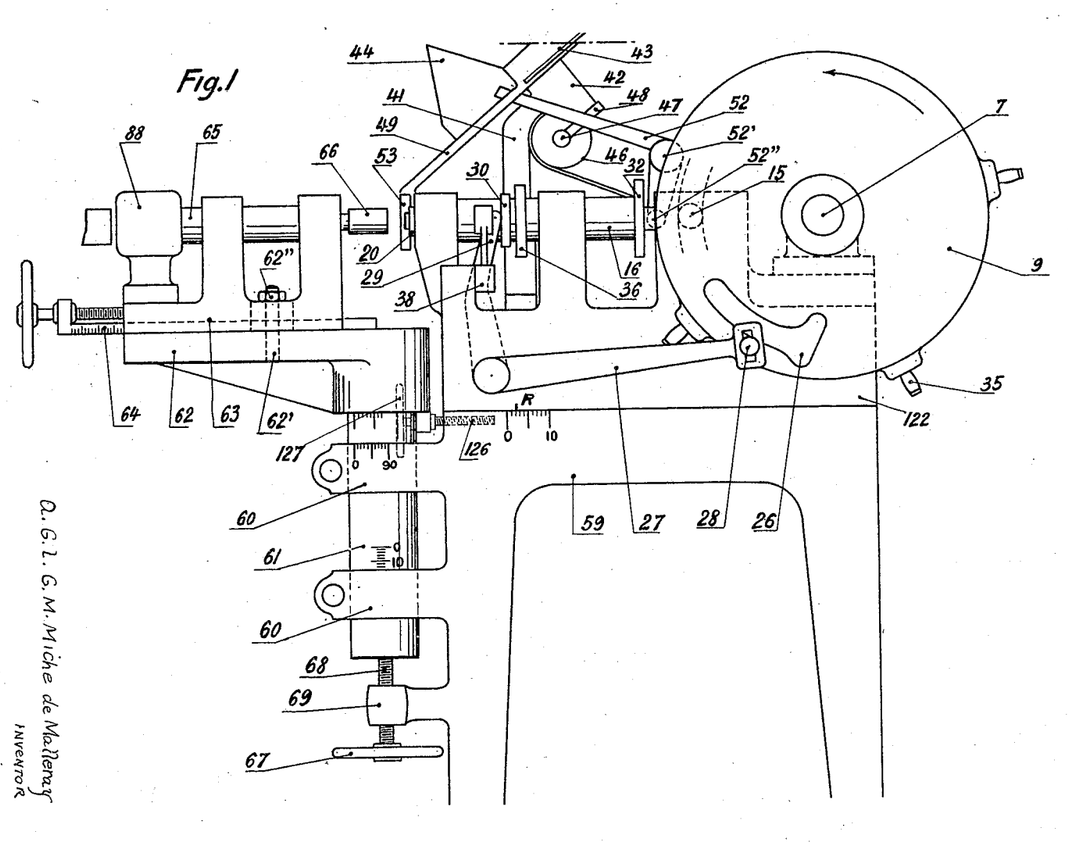
Fig. 1 is a side view thereof.

In front of the end of this button-holding slide 16, the support 59 holds the column 61, the axis 200 of which is vertical, through the securing collars 60 (Fig. 1) borne by said support; to this column is secured the bracket 62. The height of the column 61 can be adjusted by means of the screw 68 engaging the stationary nut 69 and controlled by the hand-wheel 67. The bracket 62 is provided with a vertical spindle 62' round which a rectangular slide 64 can pivot. A second bracket 63 moves along this slide and bears the horizontal tool-holder shaft 65 ending with the tool-holder 66 and an electric motor 88 controlling directly the shaft 65. A screw 64' (Fig. 2) provided with a hand-wheel and not movable longitudinally with reference to the slide 64 passes through a nut secured to the bracket 63, the position of which can thus be easily adjusted. A nut 62'' allows the guide 64 together with the bracket 63 to be kept stationary with reference to the bracket 62. The working of the machine is as follows:

The position of the tool with reference to the button to be grooved can be adjusted by means of the four following movements:

1. The vertical movement of the column 61;
2. The rotation of the said column round its axis;
3. The movement of the bracket 63 along its slide 64;
4. The rotation of the bracket 63 with reference to the bracket 62 caused by rotating the slide 64 round the spindle 62'.

Thus the tool can be adjusted with reference to the button in height, direction and distance. In order to allow this adjustment, when ascertained for a given type of buttons, to be easily reproduced each time the same type of buttons is to be grooved, it is of advantage to provide the tool holder arrangement with a series of graduations one of which is a vertical graduation along the column 61, another of which gives the angular rotation of said column round its axis and the third allows the movement of the bracket 63 along the slide 64 to be measured. By means of these adjusting devices, the button can be worked in any desired manner. After the tool is properly adjusted and set to work, the control shaft 1 is caused to rotate. Thus the slide actuating cam revolves and during each of its revolutions brings the button in front of the tool as many times as there are cuts to be made. After each cut, whilst the slide is being moved back, the slide actuating cam causes the button to be rotated through the desired angle (as explained hereinbelow) and after the last cut causes it to be set free (as also explained hereinbelow). It then keeps the slide at a distance from the tool so as to allow another button to be secured to the end of the said slide.

Having thus concisely described the machine and the general working thereof, I will now proceed to describe in detail the several devices it comprises.

Figures 2, 7, 9, 13:
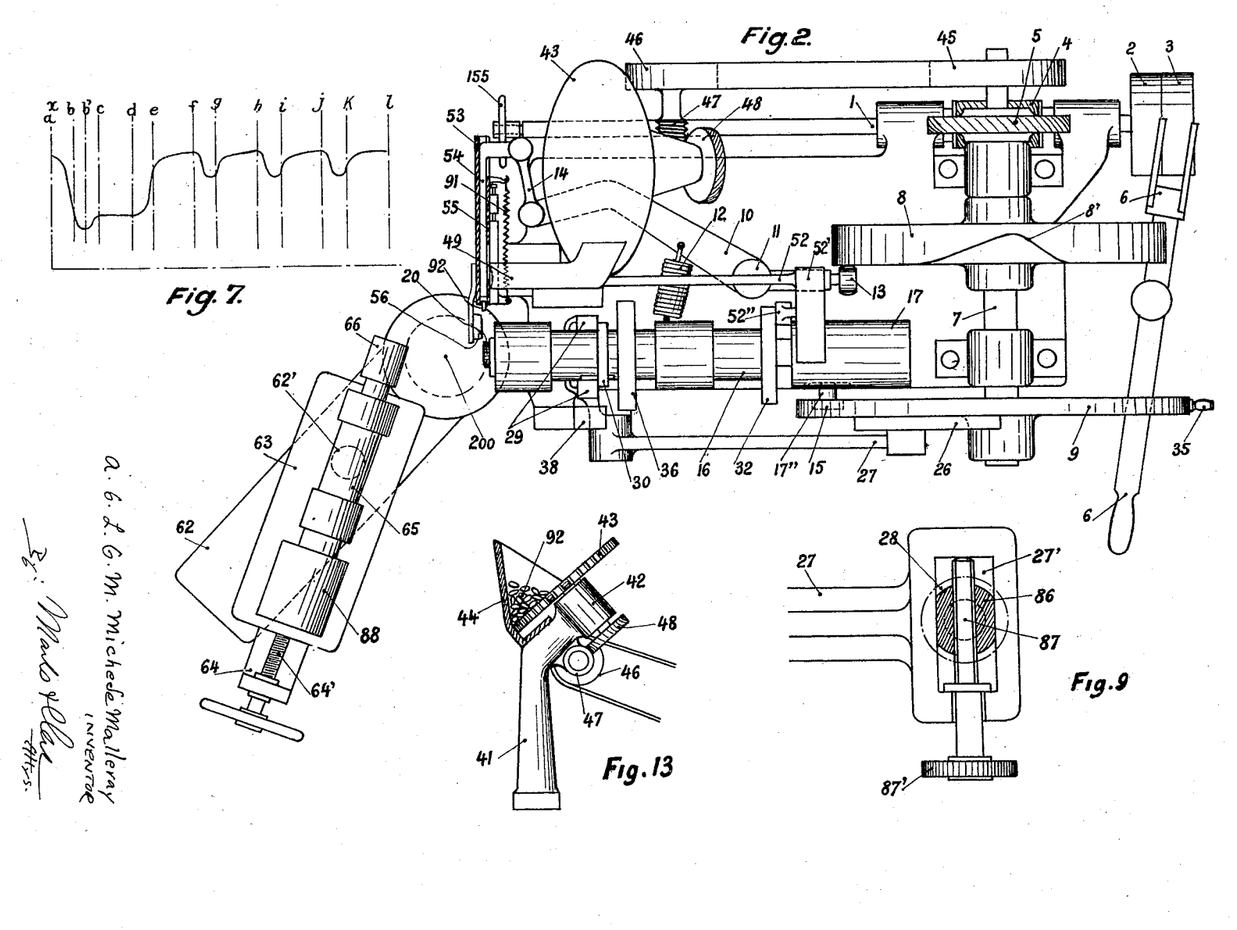
Fig. 2 is a top plan view.
Fig. 7 is a diagram of the to and fro movements of the slide holding the button.
Fig. 9 illustrates the adjustable means used for releasing the button from its chuck.
Figs. 13 and 14 are detail views of the button feed device and of the arrangement for inserting buttons in the chuck.
Figure 3:
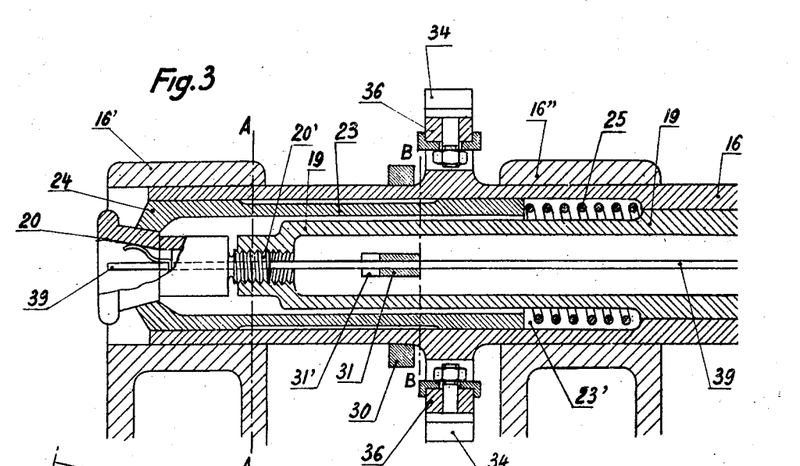
Figs. 3 and 3ª taken together present a longitudinal cross-section of the slide and of the chuck holding the button.
Figure 3A:
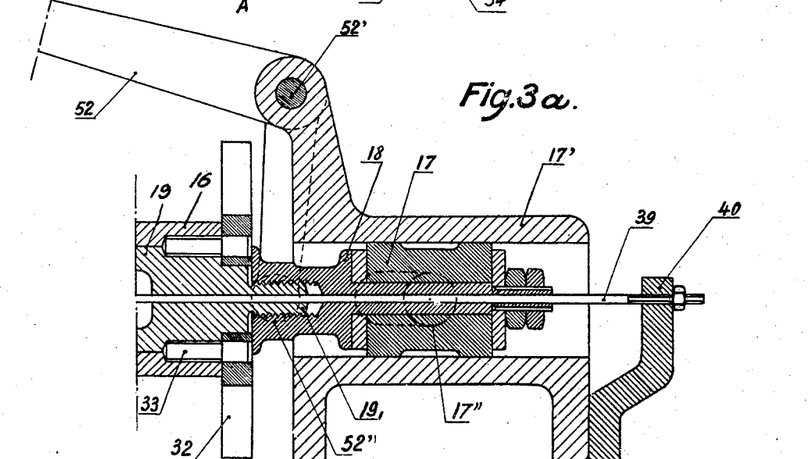
Figure 4:
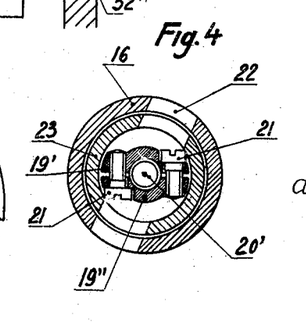
Fig. 4 is a cross-section of the apparatus along the line A—A on Fig. 3 showing the means whereby the chuck holding the button is secured to the slide.

The button-holding slide is shown in detail on Fig. 3. It comprises the slide proper 17 borne by the bearing 17' inside which it can slide without rotating by means of a stud 17'' passing through a slot in this bearing and the extremity of which is secured to the roller 15 (Fig. 2) engaging a groove in the slide actuating cam 9. To the left hand side of this slide proper 17 is pivotally secured a projection 18 the end of which shows a threaded hole. The rotating part of the slide comprises two parts 16 and 19 secured one to the other and adapted to slide in the bearings 16', 16''. These two parts are secured together by means of the screws 33 engaging both parts and which as described hereinafter serve to hold a part 32 termed the paddle disc. The central part 19 ends with a threaded projection $19_1$ screwed and inserted inside a recess in part 18 which can rotate with reference to the slide proper 17. To the end of the inner part 19 of the rotating part of the slide is screwed through its end 20' a button-holding chuck 20 of any known type, the jaws of which are caused to separate under the action of a spring; the end of the part 19 is cleft so as to form two parts (Fig. 4) 19' and 19'' which can be brought close together by the screws 21. In order to secure the chuck 20 in its proper position, which depends on the thickness of the button to be cut, the screws 21 are loosened and the end 20' of the chuck is screwed in its proper position. The parts 19' and 19'' are then brought near each other and the chuck is held tight by screwing down the screws 21. These can be reached through apertures 22 provided in the slide 16 and in the inner part 23 described hereinbelow.

Between the two parts 16 and 19 of the rotating part of the slide is provided a circular recess 23' wherein a sleeve 23 can slide. The end 24 of said sleeve is provided with a conical hole and is constantly impelled towards the left by a spring 25. This releasing sleeve 23 is secured to a ring 30, by means of a key 31, passing through slots 31' provided in the inner and outer tubular parts 16 and 19. The ring 30 can be, as will be explained hereinafter, moved towards the right by a roller and can thus bring the sleeve 23 towards the right against the action of the spring 25 so as to move the cone 24 away from the jaws of the chuck 20 and to allow these to be opened under the action of the spring adapted to separate them. Thereby at the moment the slide 17 and the sleeve 23 are in their extreme position towards the right, the button is released by the shock of the button against the end of the rod 39 passing through the whole length of the slide parts 16 and 17 and adjustably secured to the frame 40.

The rotating parts 16—19 of the slide not only serve for allowing the opening of the chuck jaws through the sleeve 23 but also prevent any undesired movement of the chuck whilst a button is being cut. To positively hold the chuck in place, it is secured by its rear part 20' to the inner part 19 of the slide whilst the front part is held by the cone 24 which is itself well guided by the outer part 16 of the slide. The chuck, when it closes over a button is thus perfectly secured to the slide 16. Further with view of reducing the overhung part of the slide, the bearing 16' is disposed as far as possible towards the left. The slide and chuck are thus in the best conditions for a steady working.

Figure 5:
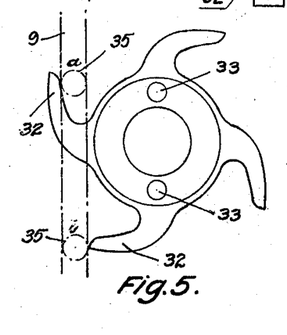
Fig. 5 is a front view of a disc provided with peripheral curved projections or paddles and secured to the rotating part of the slide.
Figure 6:
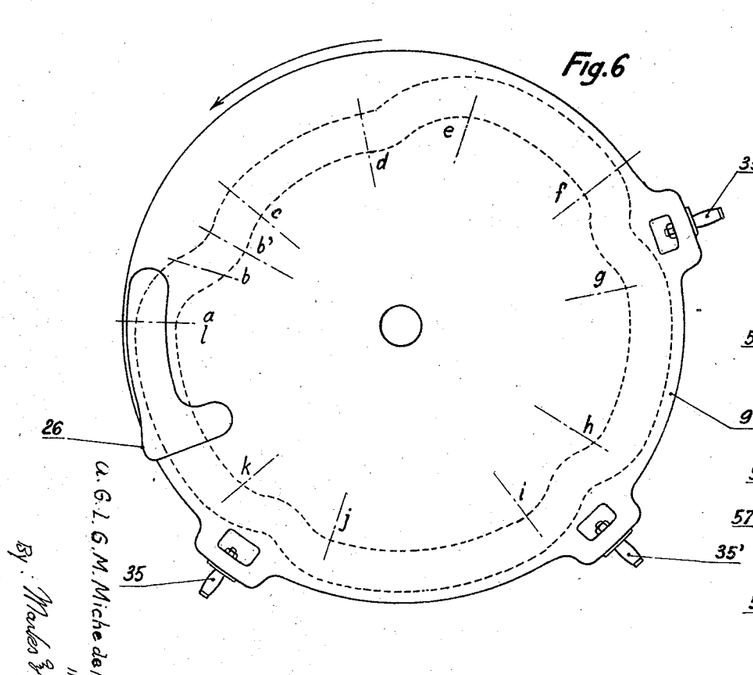
Fig. 6 is a front view of the slide cam.

To the right end of the rotating part of the slide 16—19 is secured a paddle-disc 32 (Fig. 5). This disc is provided at its periphery with curved projections, the number of which is the same as that of the cuts to be made on the button (four in the case of Fig. 5). The slide actuating cam 9 (Fig. 1) bears also at its periphery projections 35 (Fig. 6). When the cam 9 rotates, one of these projections 35 moves in a plane parallel to that of the slide 16 and comes against the paddle disc 32 as shown on Fig. 5 first at a whereby it brings it to 32′ after which it slips off. Consequently after the passage of each projection 35, the paddle disc has moved by one quarter of a revolution in the example given. This rotation is produced after each cut, the slide 17 being then slightly moved backwards so as to disengage the tool. The shape of the paddle is such as will cause the projection 35 to bear against and to slip off the paddles tangentially. The rotation is thus effected in a progressive and silent manner.

By omitting the paddles or the projections on the cam there is no more rotation of the button provided. This provides for one single cut or for a circular cut. A rotation of 180° is produced by making the disc rotate twice through one quarter of a revolution in succession by two projections of the cam. For one third of a revolution or less the rotations are provided for in the above described manner, each projection causing the slide to rotate through the desired fraction of a revolution. The release of the button after the cuts have been made is provided for in the following manner. On the outside of the sliding cam 9 is secured (Figs. 1 and 2) a guiding cam 26 against which a roller 28 is brought to bear. This roller is borne by the end of a bell crank 27, the other end of which bears also two rollers 29 bearing against the sliding ring 30 (Fig. 3) which the key 31 secures to the releasing sleeve 23. Whilst the slide 16 is brought backwards after the button is finished the bell crank 27 actuated by the guiding cam 26 pushes the ring 30 towards the right together with the releasing sleeve 23 so that the spring jaws of the button-holding chuck 20 open and the button is set free by the end of the rod 39.

The jaws of the button-holding chuck close more or less according to the diameter of the button they have to hold. Thereby the cone 24 advances more or less along the conical bearing afforded by the chuck 20. In order to give the cone 24 a minimum travelling distance during the setting free of a button, the position of the origin and end of this travelling distance which is to remain constant, are preferably adjusted with reference to a given cross-section of the chuck. To accomplish this the roller 28 is adjustably disposed at the end of the crank 27 as shown on Fig. 9. The end of the crank 27 is provided with a rectangular aperture 27′ wherein a nut with parallel sides 86 is adapted to move. This nut is screwed over the screw 87 provided with the controlling knob 87′ and secured to the spindle of the roller 28.

Figure 8:
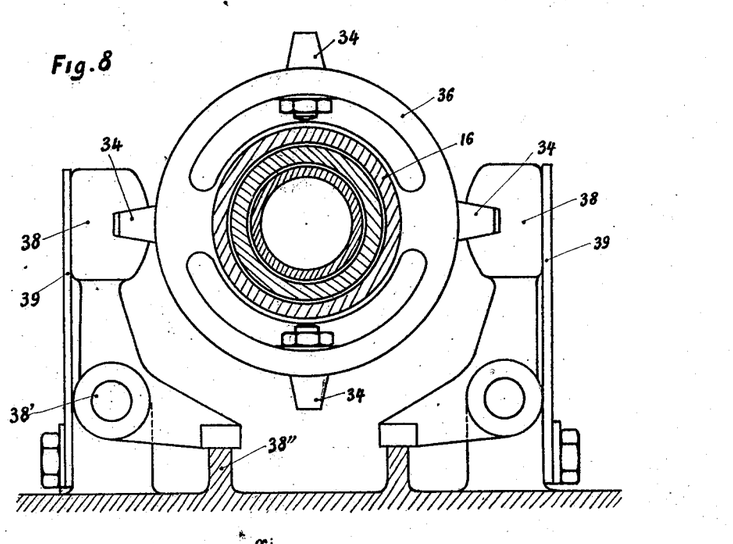
Fig. 8 is a front view of the catch device which keeps the rotating part of the slide stationary whilst the tool is working.

In order to prevent the rotation of the rotating slide 16 each time the tool is operative the said slide is provided (see Figs. 3 and 8) on its outer side with a flanged disc 36 to which are secured projections 34 equally distributed and the number of which is equal to that of the cuts to be made (four for instance). When the rotating part 16 has rotated through the desired angle under the action of the projection 35 of the slide cam on the paddle 32, one or more projections 34 come, when the slide is at its extreme left position, in front of recesses provided in square-shaped bolts such as 38 which pivot round a spindle 38′ and are kept by a spring-blade 39 against a stop 38″. When the slide 16 has moved to its working position the projections 34 engage the bolts 38 and the slide can no more rotate whereby the tool is allowed to work.

Figure 14:
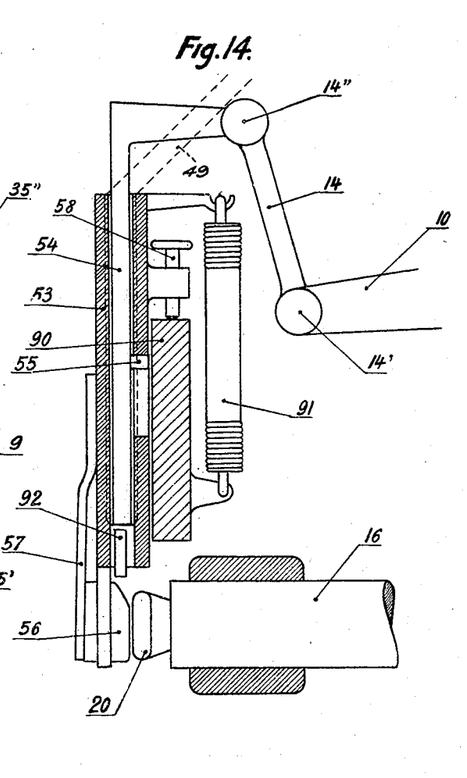

The buttons 92 (Fig. 13) are fed from the hopper 44 closed at its bottom by an inclined plate 43 secured to the bearing 42 and support 41. The plate may be rotated through the pulleys 45 and 46, the pulley 46 controlling the worm gear 47—48 controlling in its turn the position of the plate 43. When the latter is open, a button is allowed to slide over the trough 49 towards the chuck through the action of the lever 52 actuated by the rearwardly moving slide 16. The button falls from the trough into the vertical slide 53 shown on Fig. 1 and inside which a rod 54 is adapted to move. The said rod is controlled by a rod 14 pivoted at 14′ to a lever 10 pivotally secured to a spindle 11 and ending with a roller 13 constantly urged by a spring 12 against a cam 8 termed feed cam and borne by the principal shaft 7 of the machine. This rod 54 bears a stud 55 (Fig. 14) which moves in a longitudinal slot having a given length and provided in the slide 53. The feed cam 8 shows one single notch 8′ (Fig. 2) on its periphery. As long as the roller 13 is outside this notch, the lever 10 keeps the rod 54 raised; thereby the projection 55 on said rod raises the slide 53 out of the path of the slide 16. The latter can thus come close to the tool for each cut. On the contrary, when the roller 13 falls into the notch 8′ of the feed cam, the rod 54 comes nearer the slide 16 and the slide 53 urged by its spring 91 comes also nearer thereto so as to be in the feed position. The rod 54 continues to pass into the slide 53 and to push the button 92 which by means of an incline provided on the movable head 56 pushes the button until the button 92, now in front of the chuck 20 whose jaws are open at this moment, is pushed by the said spring-urged head 56 between the jaws of the chuck 20. The chuck 20 is then closed by the movement towards the left of the releasing sleeve 23 (Fig. 3). The slide 53 then moves away from its feed position to its rest position (Fig. 2) out of the path followed by the slide 16.

Having thus described the different parts of the machine and their manner of working, I will now describe in full detail the slide cam 9 and the general working of the machine. The slide cam is shown in front view on Fig. 6 and the movements it gives to the button-holding slide 16 are shown diagrammatically on Fig. 7, the ordinates $ox$ giving the distances travelled by the slide along its axis and the abscissæ $oy$ the angular displacement of the slide cam 9. In the example shown, the cam provides for four cuts. If we first consider the moment when a button is just finished and it is still bearing against the tool, the slide 16 occupies then its extreme position towards the left (Fig. 2). The controlling roller 15 is in the groove of the cam at $a$ (Fig. 6) in a part where the radius of the groove is at a maximum. On the diagram 7, the same reference letter $a$ corresponds to the same position. The cam rotating in the direction of the arrow on Fig. 6, the roller 15 slides down the slope $a—b$ whereby the slide is brought back towards the right. During this backward movement, the inclined part 26 (Fig. 1) passes in front of the roller 28 of the lever 27 which controls the backward movement of the releasing sleeve 23 (Fig. 3) in the slide 16, so that when the slide arrives towards the lower part of the inclined part at $b$, the jaws of the chuck 20 are opened. Between $b$ and $b'$ the slide continues to move backward, the button is brought against the end of the rod 39 which sets it free. Between $b'$ and $c$ the slide moves slightly forwards in order to cause the front end of the rod 39 to disengage the chuck. Between $c$ and $d$ it remains motionless in order to allow the insertion of the button which is done as follows: the beginning of the notch 8' of the feed cam 8 (Fig. 2) comes in front of the roller 13 and through the action of the pivoting lever 10 of the rod 14, of the rod 54, and of the spring 91, the feeding slide 53 comes in front of the button-holding slide 16 in the position for inserting the button as shown on Fig. 14. The backward movement of the button-holding slide 16 between $b$ and $c$ makes the rod 52 pivot (Fig. 1) so as to allow a button to enter the trough 49. This button falls and when the roller 13 falls into the notch 8' of the feed cam 8, the rod 54 continues to slide along the slide 53 and sets the button 92 between the open jaws of the chuck 20 which closes as soon as the roller 28 leaves the slope 26. At this moment, the controlling roller 15 of the button-holding slide 16 engages the ascending part $d—e$ of the cam groove, so that the slide 16 moves towards the left. The projections 34 engage the bolts 38 whereby the rotating part of the slide is prevented from rotating any further. At the same time, the latter part continuing its movement towards the left brings the button in front of the tool. This contact lasts the time necessary for the roller 15 to travel over the arc $e—f$ of the groove. Between $f$ and $g$ the button-holding slide 16 is first brought back towards the right. The button is set free of the tool and the projections 34 disengage the bolts 38. The rotating part of the slide is thus free to rotate. At the same time, the projection 35″ of the slide cam 9 comes against one of the paddles 32 and makes the rotating part of the slide rotate one quarter of a revolution. In the forward movement succeeding this backward movement, the projections 34 engage the bolts 38 and again prevent the rotating movement of the slide 16—19. Between $g$ and $h$ the button is again in contact with the tool which gives it the second cut. Between $h$ and $i$ the button-holding slide moves again away from the tool and the projection 35′ causes it to rotate a second time after which it is again bolted against rotation. Between $i$ and $j$ the third cut is made, between $j$ and $k$ the to and fro movement of the button in front of the projection 35 cause a third rotation of the slide and a third bolting thereof. Finally between $k$ and $l$ a fourth cut is provided for.

It should be noted that the cam 9 may provide for two cuts whilst the arrangement of the paddles provides for three cuts. In such a case two cuts only are effectively produced which are angularly displaced by 120°. More generally if the paddles provide for a greater number of cuts than the cam, a great variety of arrangements of the cuts may be obtained.

Figures 10, 11, 12:
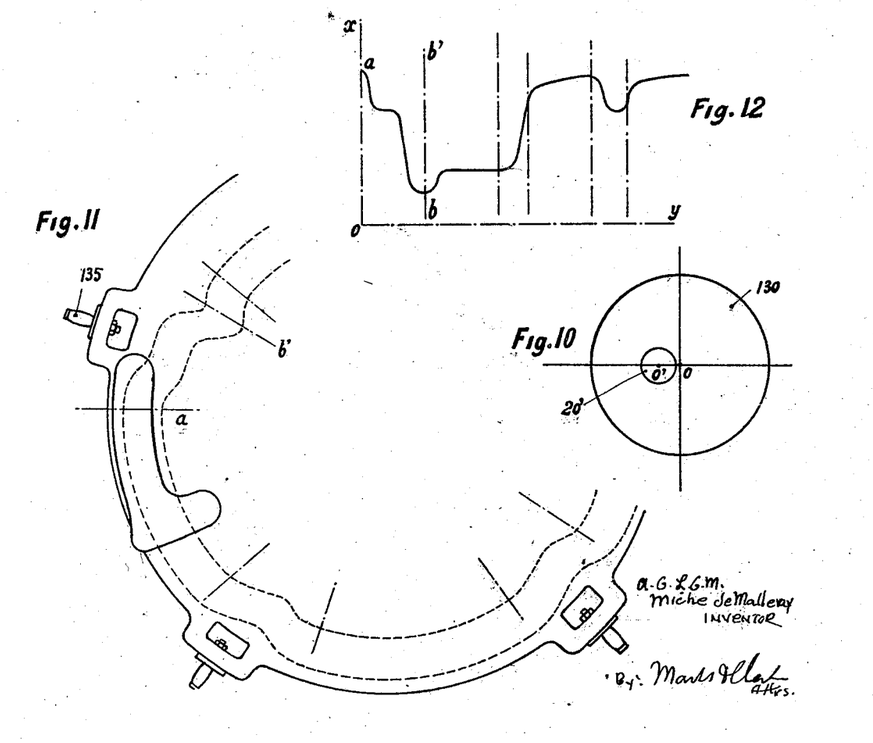
Fig. 10 shows diagrammatically the means whereby an eccentric button-holding chuck is secured to the machine.
Fig. 11 shows the slide cam used with the said eccentric chuck.
Fig. 12 is a diagram of the to and fro movements of the button-holding slide provided with the same chuck.

It has been supposed up till now that the button-holding chuck 20 was concentric with its end 20′ and consequently with the axis of the slide 16. For some decorative patterns the chuck 20 can be replaced by an eccentric chuck 130 diagrammatically shown in front view on Fig. 10. The center 0 of this chuck coincides no more with the center 0′ of its end 20′ which serves to secure the chuck in the button holding slide. If it is supposed that such a chuck is used for making for instance four cuts between which the button is rotated through one quarter of a revolution (Fig. 6) and the position shown on Fig. 10 is first considered where the line of the centers 0 0′ is horizontal, the first cut will be made in this position. The button will then be rotated by one quarter of a revolution and the second cut made with the line 0 0′ vertical. The third cut is again made with the center line horizontal and the fourth with the center line vertical. If several buttons are to be placed and to be decorated in a uniform manner with such a chuck it is necessary that the starting position for ornamenting each button be the same, that is, that the line of the centers be horizontal. In view of this, the chuck instead of simply moving back from *a* to *b'* after the fourth cut as in Fig. 6 must continue to rotate through one quarter of a revolution whilst it is moving back. This leads to the provision on the cam (Fig. 11) of another projection 135 which produces this further rotation; the result is (Figs. 11 and 12) that the outline of the cam and the corresponding diagram show an inflexion corresponding to this rotation between *a* and *b'*.

When a new series of buttons is fed into the machine, the latter must be adjusted. In view of this it must be hand-rotated and therefore (Fig. 2) the shaft 1 extends near that part of the machine where the work is being done and it is provided with a hand wheel 155 which allows it to be rotated by a workman who has his eyes on the button which is in the chuck.

The tool-holder is then adjusted for instance by means of the graduations it bears, if the series of buttons which is to be fed is of a type which has already been worked in the machine. Finally without changing these adjustments, the screw 127 is actuated whereby the support of the machine is moved with reference to its base, that is, the button-holding device is moved with reference to the tool-holder. The depth of the cut is thus ascertained and the effect of the wear of the tools is corrected whenever they have been sharpened.

What I claim is:

1. In an automatic machine for producing a number of angularly displaced ornamental cuts in buttons and the like the combination of a button-holding chuck, a longitudinally movable slide, means to hold same against rotation; a rotatable slide sliding in alignment with the first mentioned slide and adapted to hold the chuck, a cam disposed in a vertical plane parallel to the axis of the slides and adapted to rotate round its horizontal axis perpendicular to the axis of the slides, means whereby the cam gives the slides a to and fro movement, means whereby the cam gives the rotatable slide an angular movement between the cuts, means for driving the cam and means for preventing the rotation of the rotatable slide during each cut.

2. In an automatic machine for producing a number of angularly displaced ornamental cuts in buttons and the like the combination of a button-holding chuck, a longitudinally movable slide, means to hold same against rotation, a rotatable slide sliding in alignment with the first mentioned slide and adapted to hold the chuck, a cam disposed in a vertical plane parallel to the axis of the slides and adapted to rotate round its horizontal axis perpendicular to the axis of the slides, means whereby the cam gives the slides a to and fro movement, means for driving the cam, a series of paddles radially secured to the periphery of the rotatable slide, a series of projections radially secured to the periphery of the cam and adapted to engage the paddles when the chuck and slides are at the rear end of their stroke and to rotate the rotatable slide with reference to the first slide through a given angle between the cuts and means for preventing the rotation of the rotatable slide during each cut.

3. In an automatic machine for producing a number of angularly displaced ornamental cuts in buttons and the like the combination of a button holding chuck, a longitudinally movable slide, means to hold same against rotation, a rotatable slide sliding in alignment with the first mentioned slide and consisting of a comparatively long outer tube and an inner tube which holds the button holding chuck, a sleeve adapted to loosen and to tighten the chuck over the button and sliding between the two tubes of the rotatable slide, bearings for the outer tube, the front bearing being brought as far forwards as possible to steady the rotatable slide and chuck, a cam disposed in a vertical plane parallel to the axis of the slides and adapted to rotate round its horizontal axis perpendicular to the axis of the slides, means whereby the cam gives the slides a to and fro movement, means whereby the cam gives the rotatable slide an angular movement between the cuts, means for driving the cam and means for preventing the rotation of the rotatable slide during each cut.

4. In an automatic machine for producing a number of angularly displaced ornamental cuts in buttons and the like the combination of a button-holding chuck, a longitudinally movable slide, means to hold same against rotation, a rotatable slide sliding in alignment with the first mentioned slide and adapted to hold the chuck, a cam disposed in a vertical plane parallel to the axis of the slides and adapted to rotate round its horizontal axis perpendicular to the axis of the slides, means whereby the cam gives the rotatable slide an angular movement between the cuts, means for driving the cam, an outer ring secured to the rotatable slide, a series of projections secured to the periphery of said ring and spring-mounted stationary bolts adapted to engage said projections when the slide moves forwards.

5. In an automatic machine for producing a number of angularly displaced ornamental cuts in buttons and the like the combination of a button-holding chuck, a longitudinally movable slide, means to hold same against rotation, a rotatable slide sliding in alignment with the first mentioned slide and adapted to hold the chuck, a part pivotally secured to the front part of the first slide and screwed over the rear part of the rotatable slide, a cam disposed in a vertical plane parallel to the axis of the slides and adapted to rotate round its horizontal axis perpendicular to the axis of the slides, means whereby the cam gives the slides a to and fro movement, means whereby the cam gives the rotatable slide an angular movement between the cuts, means for driving the cam and means for preventing the rotation of the rotatable slide during each cut.

6. In an automatic machine for producing a number of angularly displaced ornamental cuts in buttons and the like the combination of a button holding chuck, a longitudinally movable slide, means for holding same against rotation, a rotatable slide sliding in alignment with the first mentioned slide and consisting of a comparatively long outer tube and an inner tube which holds the button holding chuck, a rear conical part on the chuck, a sleeve adapted to slide between the two tubes of the rotatable slide and recessed to receive the said conical part, a spring urging said sleeve forwards, means for moving said sleeve longitudinally against the action of the spring, a bell crank controlling said means and one arm of which is provided at its outer end with a groove perpendicular to the said arm, a roller, means for adjustably securing the roller in the groove of the lever, a cam disposed in a vertical plane parallel to the axis of the slides and adapted to rotate round its horizontal axis perpendicular to the axis of the slides, means whereby the cam gives the slides a to and fro movement, means whereby the cam gives the rotatable slide an angular movement between the cuts, means whereby the cam controls the movements of the roller, means for driving the cam and means for preventing the rotation of the rotatable slide during each cut.

In testimony whereof I have signed my name to this specification.

ALAIN GEORGES LUC GABRIEL MARIE MICHE de MALLERAY.